(12) United States Patent
Martin

(10) Patent No.: US 6,751,457 B1
(45) Date of Patent: Jun. 15, 2004

(54) REAL TIME CALL MONITORING SYSTEM AND METHOD

(75) Inventor: Dannie E. Martin, Casselberry, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 562 days.

(21) Appl. No.: 09/604,755

(22) Filed: Jun. 28, 2000

(51) Int. Cl.$^7$ ............................................... H04Q 7/20
(52) U.S. Cl. ...................................... 455/424; 455/67.7
(58) Field of Search ................................. 455/423, 424, 455/67.11, 67.7; 370/241, 244, 250; 375/213

(56) References Cited

U.S. PATENT DOCUMENTS 5,987,306 A * 11/1999 Nilsen et al. ............... 455/67.1
6,263,187 B1 * 7/2001 Do ................................. 455/9

* cited by examiner

Primary Examiner—Lee Nguyen
(74) Attorney, Agent, or Firm—Shaw Pittman LLP

(57) ABSTRACT

A system and method for real time call monitoring of call performance information in a cellular telephone system. A cellular switch is remotely accessed and placed in a call monitor mode. Call performance information (signal strength, BER and call events) are thereafter recorded and downloaded to a remote computer system that includes a display. The computer system receives and stores the recorded call information and graphically displays the call information. Preferably, the call information received is first parsed, converted and/or scaled to conform to a standard file format. In this way, the graphically displayed call performance information can be easily understood by a user even if the call performance information comes from different switch types.

17 Claims, 6 Drawing Sheets

```
07:42:00             CLR  Call Monitor: Call RSSI value
4113         Source: 6        CCPO
                              (407) 3250010 cell 201 frssi -81 rrssi -83 attn 2
fber 0 rber 0              Object: 20         A                    TC 780
                           Class: XXXXXXXXXXXX
Domain:2                        BTS:1     Chassis:          Slot:0     Port:
007:42:00            CLR  Call Monitor: Adjacent cell RSSI values from mobile
4116         Souce: 6          CAP2
                              (407) 3250010 Cell_id/RSSI: 32/-97 202/-113 491/-103
Object: 6            CAP2
                           Class: XXXXXXXXXXXX
Domain:2                        Chassis: 6       Slot: 11          Port:
07:42:00             CLR  Call Monitor: Adjacent call RSSI values from mobile
4116         Source: 6         CAP2
                              (407) 3250010 Cell id/RSSI: 412/ -87 323/ -109 203/ -103
Object: 6            CAP2
                           Class: XXXXXXXXXXXX
Domain:2                        Chassis:6        Slot:11           Port:
007:42:00            CLR  Call Monitor: Adjacent cell RSSI values from mobile
4116         Source: 6         CAP2
                              (407) 3250010 Cell id /RSSI: 1353/-113
Object: 6            CAP2
                           Class: XXXXXXXXXXXX
Domain:2                        Chassis:6        Slot:11           Port:
07:42:01             CLR  Call Monitor: Call RSSI value
4113         Source: 6        CCPO
                              (407) 3250010 cell 201 frssi -81 rrssi -84 attn 2
fber 0 rber o              Object: 20        A                     TC 780
                           Class: XXXXXXXXXXXX
Domain:2                        BTS:1Chassis:             Slot: 0      Port:
07:42:01             CLR  Call Monitor: Call Handoff has taken place
4104         Source: 2        CCPO
                           Ph#: (407) 3250010 Handoff from 201 to              32
Object: 3                B    TC 755
                           Class: XXXXXXXXXXXX
Domain:1                        BTS:2 Chassis:       Slot: 0       Port:
07:42:01             CLR  Call Monitor: Call Path Assigned
4101         Source: 2        CCPO
                              Ph#: (407) 3250010 Handin connect E1: 0, 7 Tl: 0, 4
755 TDMA-3                 Object: 3         B                     TC 755
                           Class: XXXXXXXXXXXX
Domain:1                        BTS:2 Chassis:       Slot: 0       Port:
007:42:01            CLR  Call Monitor: Adjacent cell RSSI values from mobile
4116         Source: 6         CAP2
                              (407) 3250010 Cell_id/RSSI: 32/-97 202/-113 491/-101
Object: 6            CAP2
                           Class: XXXXXXXXXXXX
Domain:2                        Chassis:6        Slot:11           Port:
```

FIG. 1
*Prior Art*

STANDARD FILE FORMAT

Subscriber Number
Serving cell site
Channel
Channel type
Mobile power
$F\_RSSI_1, F\_RSSI_2, ..., F\_RSSI_n$
$R\_RSSI_1, R\_RSSI_2, ..., R\_RSSI_n$
$F\_BER_1, F\_BER_2, ..., F\_BER_n$
$R\_BER_1, R\_BER_2, ..., R\_BER_n$
$Call\_event_1, Call\_event_2, ..., Call\_event_n$
$NEIGHBOR\_RSSI_1, NEIGHBOR\_RSSI_2, ..., NEIGHBOR\_RSSI_n$
:

REAL TIME CALL MONITORING SYSTEM AND METHOD

This disclosure contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

1. Field of the Invention

The present invention is directed to management, testing and maintenance of cellular telephone systems. More particularly, the present invention is directed to a system and method for remotely initiating the monitoring of cellular telephone call parameters and displaying those parameters in a dynamic graphical form in real or near real time.

2. Background of the Invention

Unfettered mobile telephone network access, call continuity and call clarity are some of the technical considerations that are continually optimized to achieve a high level of mobile cellular telephone service. In order to achieve improved performance levels, cellular telephone service providers must, among other things, position antennas in geographically desirable locations and tune and/or direct the antennas in optimal ways. While radio frequency (RF) engineering tools exist to help properly position individual cellular telephone cell site antennas and configure overall cellular systems, the only effective way of actually determining whether the cellular antennas and their tuning/positioning have been properly accomplished is to perform field tests with a cellular telephone. Typically, such field tests are accomplished with "drive tests" wherein an RF or cellular engineer drives a vehicle around in a designated area while making one or more telephone calls using his cellular telephone. During the drive test, the RF engineer monitors call performance by noting call drops, for example, and/or collecting actual downlink data such as signal strength directly from the mobile telephone. Test equipment for the performing such tests is manufactured by, for example, X-Tel, Comarco and LCC.

The RF engineer then returns to his office where he uploads the collected data to, e.g., a computer spread sheet program, and attempts to combine or correlate this data with data, from the same time period as the drive test, obtained from the cellular system's controller or switch, i.e., a Mobile Telephone Switching Office (MTSO) or Mobile Switching Center (MSC). The data from the switch might include signal strength, Bit Error Rate (BER) and other call events, such as call handoffs, during the time that the RF engineer was performing the drive test.

Once an analysis of the combined data is complete and changes to the cellular system are made (if necessary), the RF engineer will typically return to the drive test area for another drive test to confirm that the changes made have improved overall system performance. The iterative procedure of drive testing, system changing, and subsequent drive test confirmation continues as long as cellular system subscribers (users) complain about inadequate service or it is believed that improved service, e.g., coverage and continuity, can be achieved.

While the drive test is an effective method of confirming and testing system performance, it is also an extremely wasteful exercise, in terms of time, for an RF engineer. Instead of spending valuable time making calculations and studying data to optimize a cellular system in an office setting, the RF engineer might spend half or even up to two thirds of his day driving to, around and from an area under investigation. This drive test time factor is even more pronounced if the RF engineer must travel to a rural area to investigate customer complaints and/or perform routine system checks. Thus, the drive testing conventionally employed to monitor and upgrade a cellular system's performance wastes an RF engineer's valuable time.

Additionally, the data that is collected from the mobile telephone and switch is often rather "cryptic" as illustrated in FIG. 1. Specifically, while individual parameters such as signal strength, BER, etc. are recorded over time by the switch (and where possible, by the mobile telephone itself), these parameters are output from the switch (and/or mobile telephone) as numeric or text data, which is difficult to understand unless one has extensive knowledge of the various codes and formats employed. FIG. 1 shows a typical feed of data from a switch. This difficulty is compounded by the fact that cellular system providers often deploy switches from different manufactures, e.g., Hughes, Lucent or Ericsson, and each of these manufacturers provides call information data in different formats and in different orders. This makes it particularly difficult to fully appreciate the data that is available, let alone to properly correlate the call information data from the switch with the mobile telephone data, if any, for analysis.

SUMMARY OF THE INVENTION

To overcome the deficiencies in the conventional methods described above, the present invention provides a system and method whereby the RF engineer need not himself conduct a drive test. Instead, someone else can perform the drive test while the RF engineer remotely accesses the Mobile Telephone Switching Office (MTSO) or Mobile Switching Center (MSC) ("the switch"), places the switch in a call monitor mode and captures telephone call information from both the switch and the mobile telephone (when the cellular system is a digital system) without ever having to leave his office. The present invention further provides a single, easy to follow, graphical presentation of the captured call information even though the switches or mobile telephone manufacturer's equipment from which the call monitor information is obtained might vary.

More specifically, the present invention comprises an executable program that runs on a computer, e.g., a personal computer (PC). The PC preferably includes a modem or other communications link whereby the PC can dial up the switch, issue commands to the switch to cause the switch to collect or capture call information for a particular Mobile Identification Number (MIN), and download that call information to the PC.

Upon receipt of the call information, the executable program parses the call information, depending on the format and order of the call information received in accordance with switch type that has been accessed, converts and/or scales the call information as necessary, loads the data stored into a file using a standard file format, and then graphically displays the data stored in the file, wherein the displayed data dynamically changes as new call information data is received.

Preferably, the standard file format includes a mobile service subscriber's number, e.g., a mobile identification number (MIN), the cell site that is presently serving the mobile phone, the channel that is being used, forward and reverse signal strengths, and forward and reverse bit error rates.

The standard file format preferably also includes the reverse signal strength at several other cell sites, and most preferably up to 24 cell site neighbors that are in close proximity to the serving cell, in accordance with the digital EIA/TIA 136 specification.

The data stored in the standard file format is then displayed using a graphical user interface including a graphical representation of the data along with alphanumeric information. That is, the retrieved data is displayed in a graphical, dynamic format on a computer display for the user to analyze.

With the present invention, the RF or cellular engineer no longer needs, himself, to conduct drive tests. Rather, a driver other than the RF engineer can be sent to conduct a drive test while the RF engineer remotely monitors the call from his office.

It is therefore an object of the present invention to provide a real time call monitoring system and method that captures, from a switch, in real or near real time call performance information.

It is another object of the present invention to reformat the captured call performance information into a standard format that can be used for all switch types.

It is yet another object of the present invention to provide a real time call monitoring system and method that dynamically displays call performance information as it is received.

It is another object of the present invention to remotely access a cellular switch and cause it to record and send call performance information for a particular mobile telephone call.

It is also an object of the present invention to provide a real time call monitoring system and method wherein persons other than RF engineers perform cellular system drive tests.

It is a further object of the present invention to provide a real time call monitoring system and method that provides a single graphical user interface for call performance information that is obtained from switches having different manufacturers and thus different formats.

These and other objects of the present invention will become apparent upon a reading of the following detailed description in conjunction with the accompanying drawings.

BRIEF DESCRIPTION OF THE DRAWINGS

FIG. 1 is a selected portion of downloaded mobile telephone call information obtained for a switch.

FIG. 3 is an exemplary standard file format in accordance with the preferred embodiment of the present invention.

DETAILED DESCRIPTION OF THE INVENTION

Figure 2:
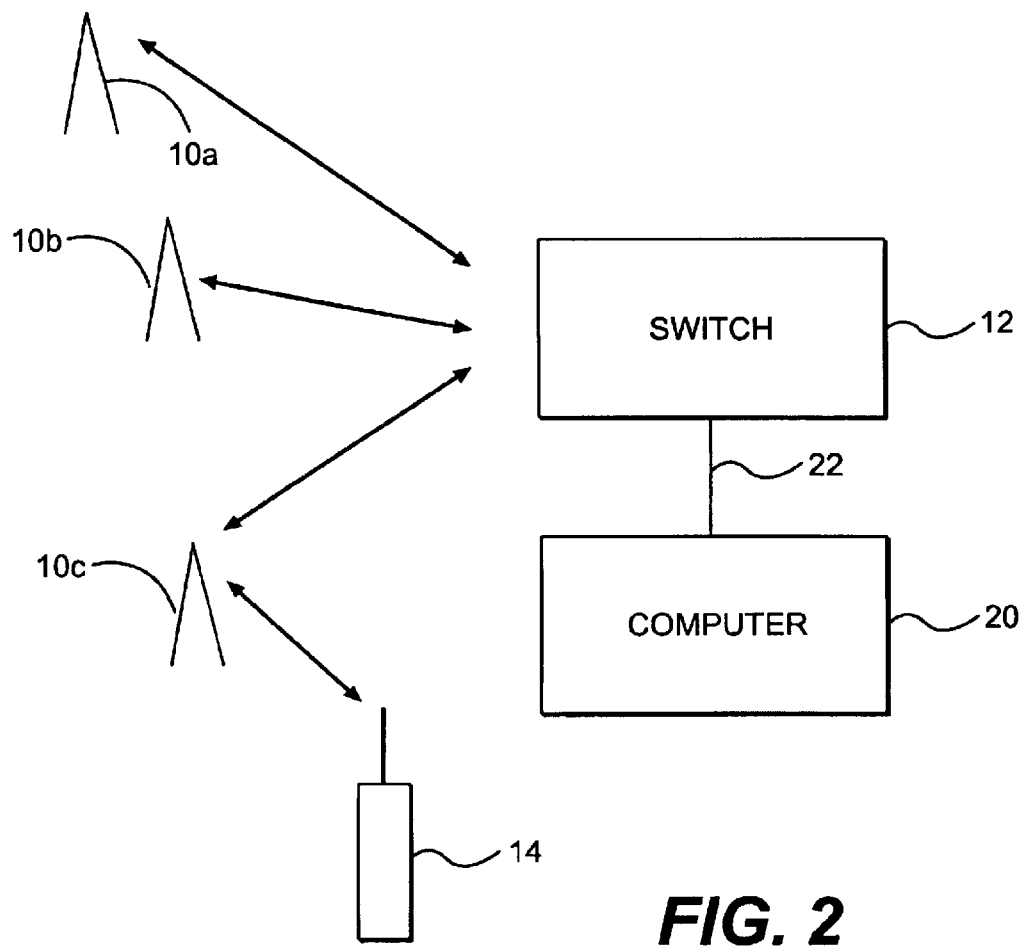
FIG. 2 schematically illustrates the preferred embodiment of the present invention.

FIG. 2 schematically illustrates the preferred embodiment of the present invention in which a plurality of cell sites 10a, 10b, 10c are in communication with a Mobile Telecommunications Switching Office (MTSO) 12, also sometimes referred to by those skilled in the art as a Mobile Switching Center (MSC), but generally referred to herein as a "switch". Cell sites 10a, 10b, 10c monitor signals transmitted by mobile telephone 14 and pass relevant information to the switch, all in conventional manner. This information typically includes signal strength parameters, and bit error rate (BER) information. Based on this received information, the switch assigns a particular cell site, e.g., 10c, to be the present or next (after a handoff) serving cell for a call initiated or to be received by mobile telephone 14.

Also shown in FIG. 2 is a computer 20, a PC for example, on which an executable program of the present invention preferably resides. The computer code in accordance with the preferred embodiment of the present invention is attached hereto as Appendix A. This code is preferably run in combination with well-known modules available in, e.g., Visual BASIC, for performing graphics functions, like those described later herein. Computer 20 is in communication with switch 12 via link 22, which may be a dedicated telephone line or any other suitable link, including wireless links, that permit computer 20 to communicate with switch 12. Thus, computer 20 may include a modem (not shown) for effecting communication.

Specifically, computer 20 accesses switch 20 to place the switch in a call monitor mode whereby the switch, upon receiving the appropriate command(s) begins recording call information for a particular mobile call. In the preferred embodiment, the user of computer 20 identifies a Mobile Identification Number (MIN), e.g., a mobile telephone's telephone number that is uploaded to switch 12. After the MIN is identified, switch 12 records call parameter information related to calls being routed to/from the mobile telephone having the identified MIN.

The recorded call parameter information is preferably transmitted to computer 20 via link 22 and parsed such that a standard call monitoring file is dynamically created or a database is populated. The standard file or database preferably has a standard file format described with reference to FIG. 3. This standard file format preferably includes a subscriber number, the serving cell site, the channel that is carrying the call, the channel type, forward and reverse signal strengths, and forward and reverse BERs (see FIG. 3). It is noted that BER data is applicable only where there is a digital cellular system. Also, reverse signal strength only is typically available in an analog system. However, since there are ongoing efforts on the part of the cellular telephone industry to convert all cellular systems to digital systems, the present invention will generally always be able to receive all of the data described thus far.

Also included with the data coming from switch 12 when in a call monitor mode are the signal strengths of other, neighboring, cell sites. This information is preferably also stored in the standard file format of FIG. 3. Further, switch 12 transmits call event information to computer 12. Call event information includes, for example, indications of hand offs, end call events (e.g., normal end, drop), and new calls. This data too is stored, in the standard file format of FIG. 3.

As noted, the data received from switch 12; is preferably parsed to extract only the information that is to be stored in the standard file format. The parsed information is then preferably converted or scaled so that it can be easily displayed in the graphical user interface of the present invention. That is, because each switch manufacturer, e.g., Ericsson, Lucent, Hughes, has a different format and order for their call monitoring data, the present invention preferably includes tables and conversion charts to modify the data received into data that can be easily plotted in accordance with the present invention, as will be explained next. Implementation of such tables and conversion charts are well known to those skilled in the art and depend on the switch being accessed and the type of graph being plotted.

Figure 4A:
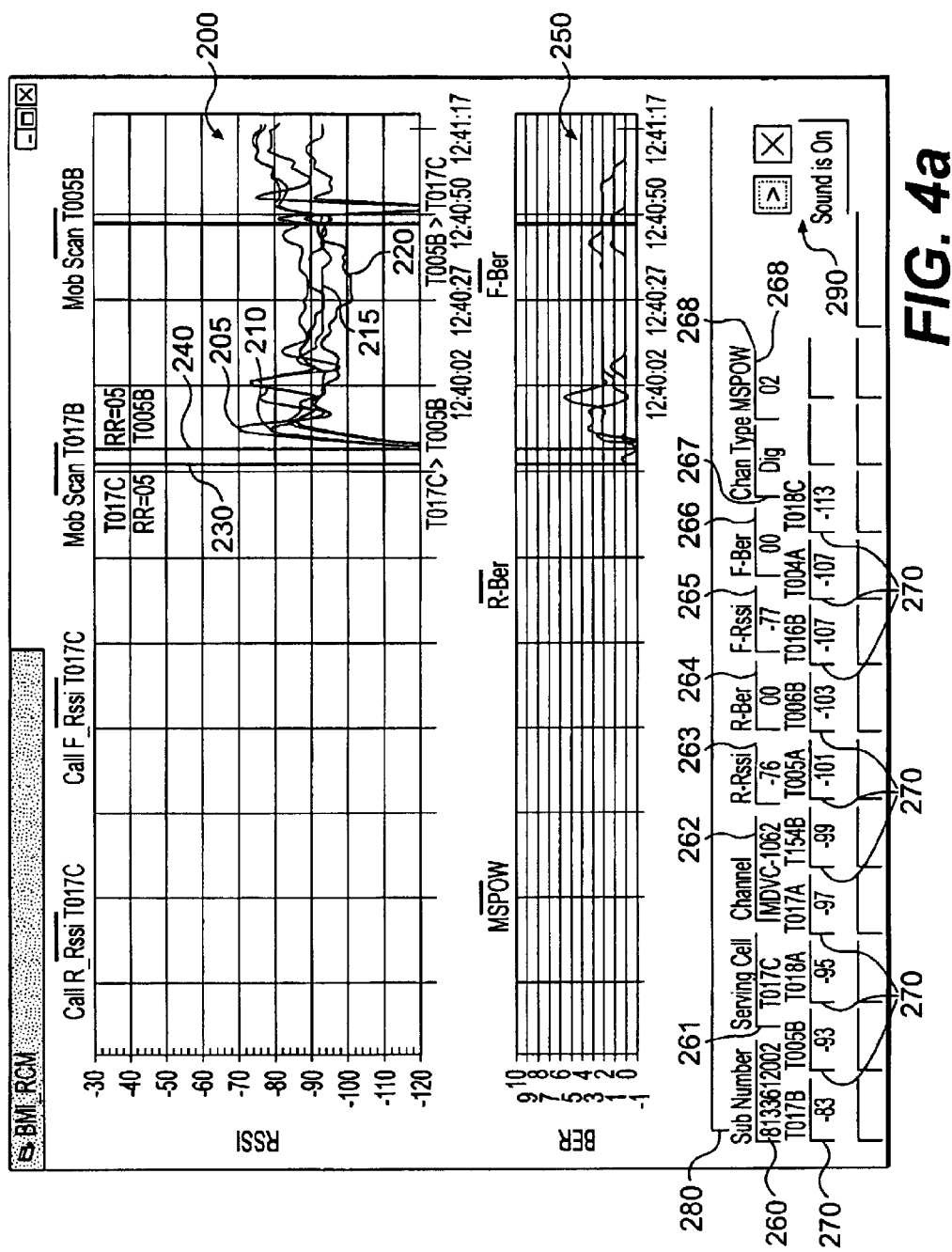
FIGS. 4a and 4b are exemplary displays generated by the preferred embodiment of the present invention.

FIG. 4a is an exemplary screen display in accordance with the preferred embodiment of the present invention. In the upper region of FIG. 4a, graph 200 preferably displays four separate plots (described below). The vertical axis of graph 200 represents signal strength (RSSI) and the horizontal axis tracks call information and time. More specifically, the spacing on the horizontal axis is based on the amount of data, i.e., the amount of call information for a particular call, that there is to plot. The time indication at the bottom right-hand side of graph 200 corresponds to the time of the current message, or call information, being plotted. This time indication is stepped over to the next (leftward) vertical division line after, e.g., 10 messages are received. The receipt of 10 messages, however, may cover 10 seconds or 30 seconds depending on the nature of the call. For example, if a mobile phone user is stationary with stable signal strength and stable BER, very few changes in call performance data will likely be recorded at the switch. On the other hand, if the user is driving in an urban area while making several calls over a short period of time, numerous "end call", "new call" messages and cell site hand off events will be recorded by the switch and the graph being plotted will move more quickly to the left as compared to a graph plotting the call of the stationary user.

Plotted in graph 200 of FIG. 4a are the reverse and forward signal strengths 205, 210 of the active, or serving, cell site. It is noted that a call's forward signal strength, i.e., the strength of the signal from the cell site to the mobile phone is available only in a digital cellular system since in such a system the mobile phone returns that information back to the cell site and the information ultimately makes its way to the MTSO, or switch.

In this case, the serving cell site is called "TO 17C", which is indicated both at the top of graph 200 and at the bottom of the screen in text box 261. In a color display environment, each plot is preferably color coded for improved readability, and the color associated with each plot is indicated by the small horizontal bars at the top of FIG. 4a. The mobile service subscriber's telephone number is also indicated at the lower left of the screen in text box 260. This is the telephone number of the mobile telephone for which call monitoring is occurring.

Also plotted in graph 200 are the two "neighboring" cell sites 215, 220 having the highest reverse signal strengths as compared to all other possible cell sites, after the serving cell site. In this case, cell sites "T017B" and "T005B" have the highest signal strengths ("Mobile Scan") and, accordingly, their data is plotted also in graph 200. Meanwhile, the text boxes at the bottom of the screen also indicate in numerical format in text boxes 270 the signal strengths of the two neighbors as well as all other cell sites for which the switch has data for the call being monitored.

Relatively thick vertical bars 230, 240 indicate a call event such as a hand off or dropped call. The code associated with the call event, e.g., "RR=05" is indicated adjacent vertical bars 230, 240 and an explanation of that code may also be indicated in text box 280 immediately above "Sub Number" text box 260 towards the bottom of the screen.

Graph 250 plots the power level of the mobile phone and the reverse and forward BER. In an analog system, however, BER is not a relevant factor. Accordingly, when an analog system is analyzed, the "plot" of this parameter is set to "−1."

The bottom of screen of FIG. 4a indicates in various text boxes the MIN being monitored in text box 260 and the serving cell site in text box 261. The channel over which the call is taking place is also indicated in text box 262. The current numerical values of the forward and reverse BER and signal strengths are provided in text boxes 263–266. The channel type (digital or analog) is shown in text box 267 as is the current power level of the mobile phone in text box 268. The numerical values of the signal strengths at all neighboring cell sites are also shown. According to the digital EIA/TIA 136 specification, up to 24 neighbors are permitted. Accordingly, there preferably are 24 individual text boxes 270. In the example shown, only 10 neighbor cell sites are enabled.

Finally, at the bottom right hand corner of the screen display is a sound enable button 290, which when set, causes a predetermined relatively short "audible" indication of a call event that is occurring. For example, if there is a call hand off, a sound card (not shown) in computer 20 generates the words "hand off" and plays the words at the same time the call event is depicted in graph 200. In this way, even if the RF or cellular engineer is not watching the display screen and graphs being plotted, he will be timely notified of a call event.

Figure 4B:
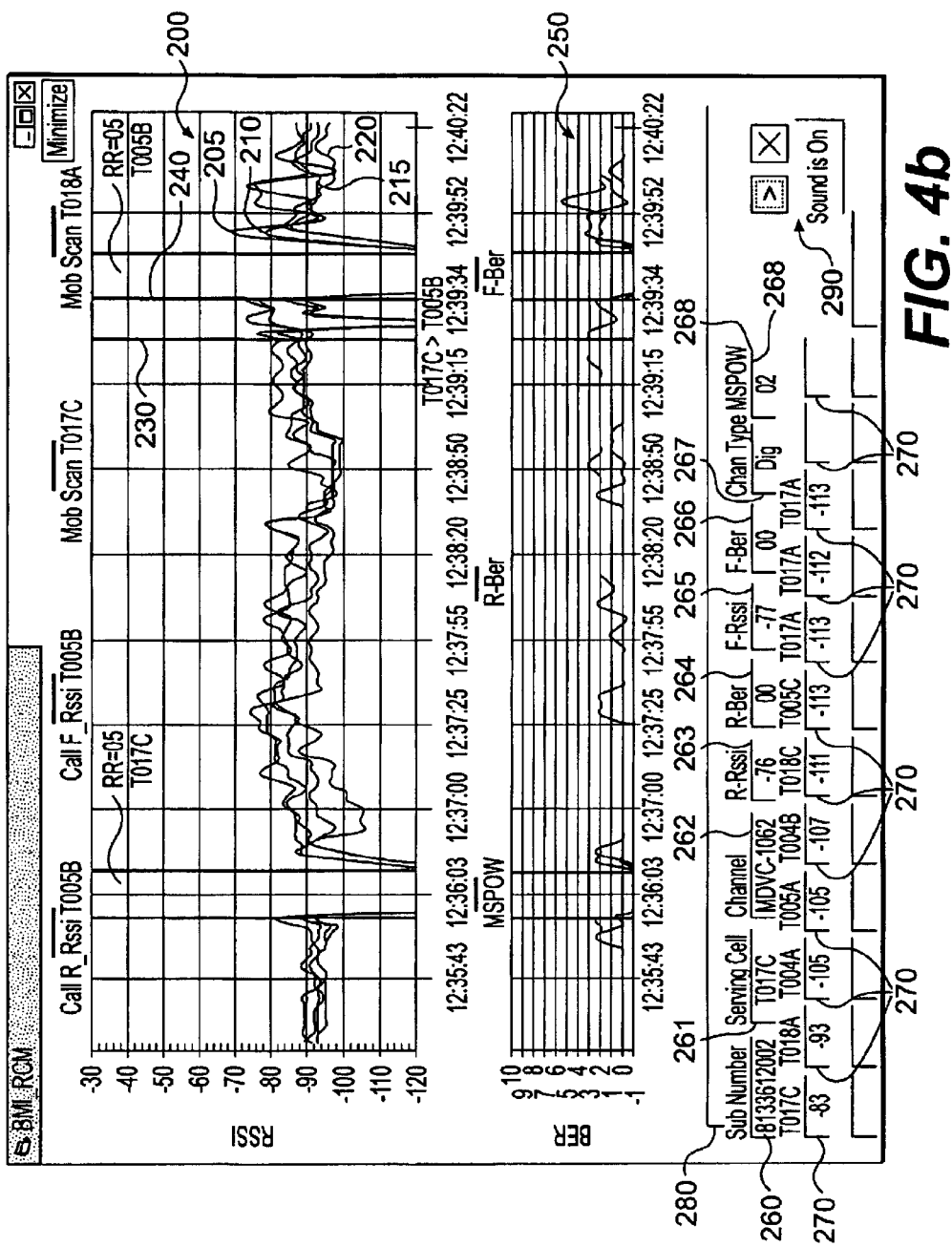

FIG. 4b shows what the screen of FIG. 4a looks like after a period of time. That is, as data is received from switch 12 the plots on graphs 240 and 250 move toward the left, whereby the most recent call monitoring information is displayed on the right hand side of the graphs. In this way, a dynamic graphical user interface is provided for a user.

Figure 5:
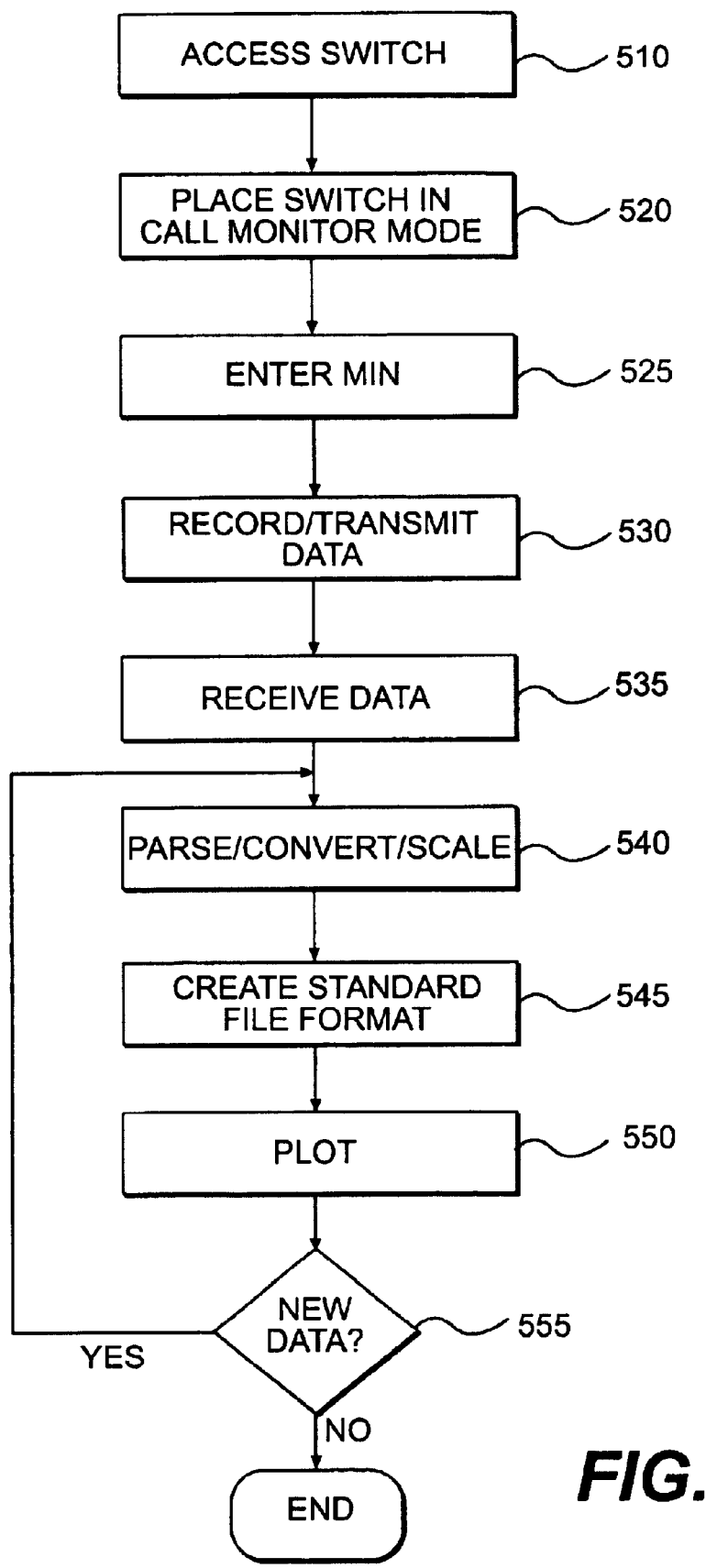
FIG. 5 is a flowchart depicting the method of the preferred embodiment of the present invention.

FIG. 5 is a flowchart depicting the method of the present invention. In step 510 computer 20 accesses switch 12 via link 22. As described above, link 22 can be a modem or other link, e.g. LAN, WAN or the Internet. At step 520, switch 12 is placed into a call monitor mode. At step 525, a MIN is provided to Switch 12. Switch 12 thereafter records and transmits to computer 20 call monitor information related to the identified MIN, step 530. At step 535, the data is received at computer 20 and preferably stored in a temporary file as necessary. At step 540 the stored data is parsed, converted and/or scaled to place the data in a common format that can be easily plotted and displayed. During step 545, a standard format file or database is then populated with the parsed, converted and/or scaled data from Step 540 and then at step 550 the call monitor information is plotted and displayed, e.g., in a graphical user interface like that shown in FIG. 4a. At step 555 it is determined whether any new call monitor (parameter) information has since been received. If not, the process ends. If there is new data (new call monitor information) that has since been received, then the process returns to step 540 where the new call monitor information is parsed, converted and/or scaled.

It is noted that the data from the switch, may not be received in actual "real time". There may be download delays due to, e.g., switch traffic, whereby the switch may not be able to immediately, i.e. in actual real time, transmit the data to computer 20. Generally speaking, however, there is usually not more than a one or two minute delay and thus a substantially real time remote call monitoring system is achieved by the present invention.

The foregoing disclosure of the preferred embodiment of the present invention has been presented for purposes of illustration and description. It is not intended to be exhaustive or to limit the invention to the precise forms disclosed. Many variations and modifications of the embodiment described herein will be obvious to one of ordinary skill in the art in light of the above disclosure. The scope of the invention is to be defined only by the claims appended hereto, and by their equivalents.

What is claimed is:

1. A method of monitoring a cellular call, comprising the steps of:
    (a) remotely accessing a switch at a first location, the switch switching one or more cellular sites in a cellular system;
    (b) remotely placing the switch in a call monitor mode;
    (c) recording call information related to a cellular call;
    (d) transmitting the call information to a second location;
    (e) storing, at the second location, the call information as data in a standard file format; and
    (f) displaying the data in a graphical format,
    wherein the step of displaying the data comprises presenting a first graph illustrating the reverse and forward signal strengths associated with a mobile device and a serving cell site involved in the cellular call, the first graph further illustrating reverse signal strengths of at least two cell sites neighboring the serving cell site,
    wherein the step of displaying the data further comprises presenting a second graph, simultaneously, and in temporal alignment, with the first graph, illustrating bit error rate (BER) being experienced by the cellular call, and
    wherein both the first and second graphs respectively illustrate at least one vertical line extending from a top to a bottom of the respective graph that is indicative of a call event that occurred with respect to the cellular call, the at least one vertical line illustrated on the first graph being horizontal registration with the vertical line on the second graph, whereby correlation between the first and second graphs, at least with respect to a call event, is facilitated.

2. The method of claim 1, wherein at least one of steps (a), (b) and (d) occurs over at last one of a hard wire and a wireless link.

3. The method of claim 1, further comprising the step of at least one of parsing, converting and scaling the call information to generate the data.

4. The method of claim 1, further comprising the step of displaying the identity of a serving cell site that is the cell site over which the cellular call is taking place.

5. The method of claim 1, further comprising the step of providing an audible indication of a call event.

6. A method of monitoring cellular call information, comprising the steps of:
    (a) recording cellular call information at a switch;
    (b) transmitting the call information to a remote location;
    (c) graphically displaying the call information; and
    (d) graphically identifying when a call event has occurred,
    wherein the step of graphically displaying the data comprises presenting a first graph illustrating the reverse and forward signal strengths associated with a mobile device and a serving cell site involved in the cellular call, the first graph further illustrating reverse signal strengths of at least two cell sites neighboring the serving cell site,
    wherein the step of graphically displaying the data further comprises presenting a second graph, simultaneously, and in temporal alignment, with the first graph, illustrating bit error rate (BER) being experienced by the cellular call, and
    wherein both the first and second graphs respectively illustrate at least one vertical line extending from a top to a bottom of the respective graph that is indicative of a call event that occurred with respect to the cellular call, the at least one vertical line illustrated on the first graph being in horizontal registration with the vertical line on the second graph, whereby correlation between the first and second graphs, at least with respect to a call event, is facilitated.

7. The method of claim 6, further comprising the step of recording the cellular call information after the switch is placed in a call monitor mode from the remote location.

8. The method of claim 6, wherein step (b) is performed over a communications link.

9. The method of claim 8, wherein the communications link is at least one of a wire and a wireless link.

10. The method of claim 6, further comprising at least one of the steps of parsing, converting and scaling the call information at the remote location.

11. The method of claim 6, further comprising the step of audibly indicating that a call event has occurred.

12. The method of claim 6, further comprising the step of continually graphically displaying the call information after new call information is transmitted.

13. A real time call monitoring system for monitoring call performance in a cellular telephone system, comprising:
    a cellular switch operable to be remotely placed in a call monitor mode, said switch further being capable of recording call information upon being placed in the call monitor mode and subsequently downloading recorded call information; and
    a computer system including a display, the computer system being operable to (i) remote access the switch, (ii) remotely place the switch in the call monitor mode, (iii) receive and store recorded call information and (iv) graphically display the call information,
    wherein the computer system is operable to graphically display a first graph illustrating the reverse and forward signal strengths associated with a mobile device and a serving cell site involved in the cellular call, the first graph further illustrating reverse signal strengths of at least two cell sites neighboring the serving cell site,
    wherein the computer system is operable to graphically display a second graph, simultaneously, and in temporal alignment, with the first graph, illustrating bit error rate (BER) being experienced by the cellular call, and
    wherein both the first and second graphs respectively illustrate at least one vertical line extending from a top to a bottom of the respective graph that is indicative of a call event that occurred with respect to the cellular call, the at least one vertical line illustrated on the first graph being in horizontal registration with the vertical line on the second graph, whereby correlation between the first and second graphs at least with respect to a call event, is facilitated.

14. The real time call monitoring system of claim 13, wherein the computer system comprises a modem that communicates with the switch.

15. The real time call monitoring system of claim 13, wherein the computer system displays the call information in real or near real time.

16. The real time call monitoring system of claim 13, wherein the computer system performs at least one of parsing, converting and scaling the call information.

17. The real time call monitoring system of claim 13, wherein the computer system is operable to audibly indicate when a call event has occurred.

* * * * *